April 22, 1958     P. S. BRENTON     2,831,306
ANIMAL COAT AND COAT-SECURING LOOP
Filed Feb. 20, 1956
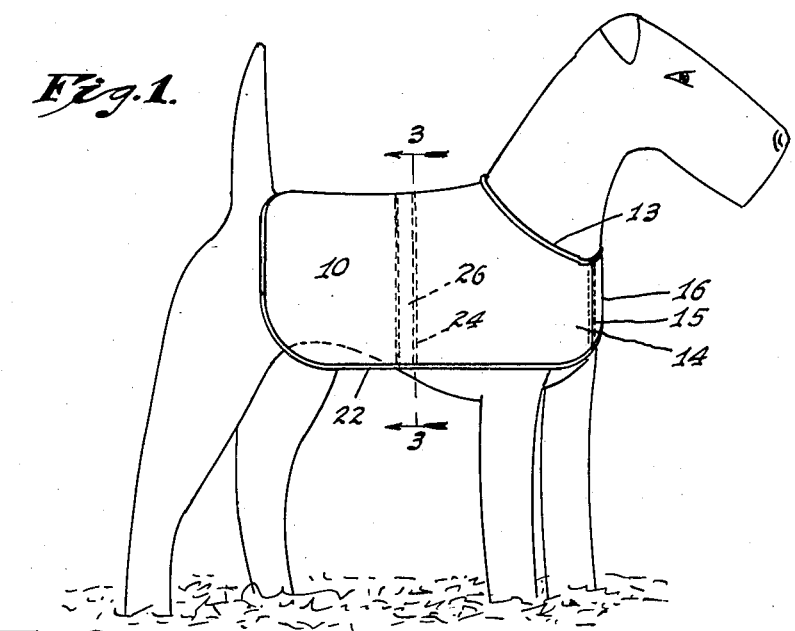
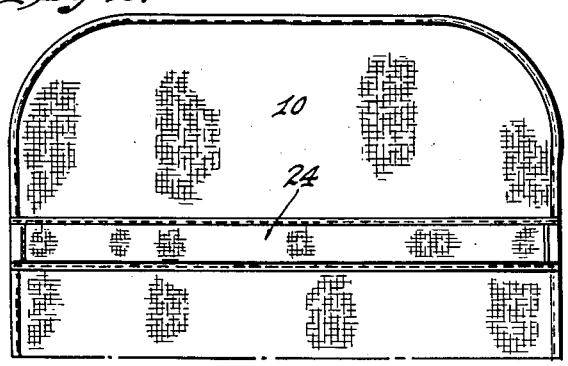
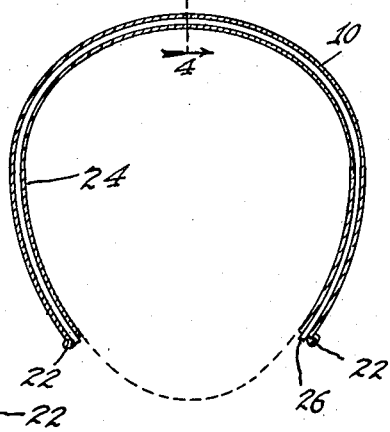
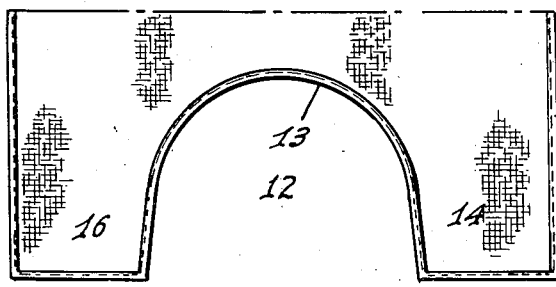
INVENTOR.
PEARL STEERS BRENTON,
BY
ATTORNEYS.

United States Patent Office 2,831,306
Patented Apr. 22, 1958

2,831,306

ANIMAL COAT AND COAT-SECURING LOOP

Pearl Steers Brenton, Indianapolis, Ind.

Application February 20, 1956, Serial No. 566,418

2 Claims. (Cl. 54—79)

This invention relates to a coat for animals, and more particularly to a coat for quadruped animals, such as dogs and cats.

It is an object of the invention to provide an inexpensive coat for animals of an improved design and appearance, which is adaptable to fit animals of varying body thicknesses. It is an object of the invention to provide an animal coat that may be easily and quickly put on, but which is tightly secured to the animal such that it will not be accidentally pulled or torn off when the animal rubs against an object. It is another object of the invention to provide a resilient loop for use in an animal coat to hold said coat tightly against the animal.

In accordance with the invention there is provided a substantially rectangular cloth blank having a semi-oval shaped area cut out from the front edge of said blank forming an opening through which the animal's head and neck protrude. Forwardly extending flaps formed along the lateral margins of the cut-out area are sewn together along their front edges to provide, in cooperation with said cut-out area, a fixed opening through which the animal's head may protrude. A channel extending laterally across the blank and disposed toward the rearward portion of said blank is adapted for holding a flexible resilient loop which extends through said channel. The resilient egg-shaped loop, which conforms to the animal's cross-sectional body configuration, springs open to permit said loop to extend around the animal's body at a longitudinal point between the regions of greatest chest depth and the lumbar region to hold the rearward section of the coat tightly against the animal.

The accompanying drawings illustrate the invention. In such drawings:

Fig. 1 is a side elevation of the coat secured on a dog;

Fig. 2 is a plan view of the blank for forming the coat shown in Fig. 1;

Fig. 3 is a vertical section taken along the line 3—3 of Fig. 1; and

Fig. 4 is a cross-sectional view taken along the line 4—4 of Fig. 3.

As shown in Fig. 2, the coat is formed from a substantially rectangular cloth blank 10. A semi-oval shaped area 12 is cut out from the front edge 13 of the blank to form an opening through which the animal's head and neck may pass. Said cut-out area is centered along the front edge of the blank with its longitudinal axis extending in a front to rear relationship with respect to said blank.

A pair of flaps 14 and 16 formed at the front of the blank along the lateral edges of the cut-out area 12 are sewn together, as at 15, along the front edge of the blank forming a permanent closure between said flaps to provide a band to extend across the front of the animal's chest and to cooperate with the cut-out area 12 to form an opening to slip the forward portion of the coat on and off of the animal's head. A hem 22 desirably extends peripherally around the blank to prevent the fraying of loose ends of cloth and to improve the overall appearance of the coat.

A channel 24 at the rearward portion of the coat extends laterally across said coat forming a sleeve or casing through which a resilient flexible loop 26 extends. Said channel may be formed by stitching the lateral edges of a strip of facing material to the underside of the coat, or by any other method commonly employed by those skilled in the art.

As shown in Figs. 3 and 4, the flexible loop 26 is a generally C-shaped spring of non-corrosive resilient spring material, desirably in the form of a strip or leaf having a width to thickness ratio of about eight to one. The loop is of sufficient length to extend around the animal's body with the ends of said loop terminating along the ventral side of the animal desirably at each lateral edge of the coat, or alternatively overlapping. The length of the vertical axis of the loop is 10%–20% greater than the maximum width of the loop. The maximum width of the loop is above the horizontal axis, thereby producing an open ended egg-shaped oval loop conforming to the general cross-sectional body configuration of the animal when said loop is placed around the animal. The flexibility of the loop permits it to be expanded or contracted to conform to varying animal thicknesses, which permits the same size coat to be worn by different sized animals within the same general size range.

To put the coat on the animal, the loop 26 is inserted through the channel 24 with the ends of the loop terminating at the lateral edges of the coat, as shown in Fig. 3. The aperture formed by the flaps 14 and 16 and the cut-out area 12 is placed over the animal's head and neck. The coat is then pulled toward the animal's tail and the loop 26 is snapped around the body to hold the coat tightly secured against the animal in a rearwardly extended position with the rearward edge of the coat terminating immediately in front of the tail.

While the invention has been described as a cloth coat, it is to be understood that the coat may be formed from any type and weight of material depending upon the conditions in which the coat is to be worn.

I claim as my invention:

1. A coat for animals, comprising a rectangularly shaped blank having a semi-oval shaped section cut out along one edge, a pair of flaps extending forwardly along each lateral margin of said cut-out section, said flaps being sewn together along their forward edge to cooperate with said cut-out section to form an opening for the animal's head and to provide a band to extend across the front of the animal's chest, a channel extending laterally across said blank, and a resilient generally C-shaped spring loop received in said channel, said loop being spaced rearwardly from said opening to embrace the animal's body between the region of greatest chest depth and the lumbar region, and said loop being of oval configuration to conform to the cross-sectional configuration of the animal body, whereby said band and loop cooperate to maintain the coat in position and in neatly fitted condition on the animal.

2. A coat for small animals such as dogs, comprising a sheet of fabric or the like forming back and side portions to lie along the back and sides of the animal, the side portions extending forward and connecting with a front band portion to extend across the front of the animal's chest, said coat portions defining a neck opening above the band portion, a channel extending laterally across the back and side portions, an open-ended egg-shaped oval loop received in said channel, said channel and loop being spaced rearwardly of said neck opening in position to embrace the rearwardly tapering portion of the animal's body between the region of greatest chest depth and the lumbar region, and said loop being shaped to generally conform to the cross-sectional configuration of the animal body, the band and loop cooperating to maintain the coat in position on the animal.

References Cited in the file of this patent

UNITED STATES PATENTS

| | | |
|---|---|---|
| 341,495 | Miller | May 11, 1886 |
| 352,470 | Logan | Nov. 9, 1886 |
| 383,821 | Morrow | May 29, 1888 |
| 1,553,632 | Rieck | Sept. 15, 1925 |
| 2,131,495 | Allen | Sept. 27, 1938 |